(12) United States Patent
Lang et al.

(10) Patent No.: US 10,583,742 B2
(45) Date of Patent: Mar. 10, 2020

(54) CURRENT COLLECTING DEVICE AND CONDUCTOR LINE SYSTEM

(71) Applicant: CONDUCTIX-WAMPFLER GMBH, Weil am Rhein (DE)

(72) Inventors: Dietmar Lang, Schliengen (DE); Niklas Endler, Schwörstadt (DE); Bernd Maier, Schliengen (DE); Dieter Seidel, Steinen (DE); Andreas Schmiedle, Lörrach (DE)

(73) Assignee: CONDUCTIX-WAMPFLER GMBH, Weil am Rhein (DE)

( * ) Notice: Subject to any disclaimer, the term of this patent is extended or adjusted under 35 U.S.C. 154(b) by 282 days.

(21) Appl. No.: 15/538,792

(22) PCT Filed: Oct. 23, 2015

(86) PCT No.: PCT/EP2015/074568
§ 371 (c)(1),
(2) Date: Jun. 22, 2017

(87) PCT Pub. No.: WO2016/128077
PCT Pub. Date: Aug. 18, 2016

(65) Prior Publication Data
US 2017/0349049 A1    Dec. 7, 2017

(30) Foreign Application Priority Data
Feb. 10, 2015    (DE) .......................... 10 2015 101 848

(51) Int. Cl.
*B60L 5/08*    (2006.01)
*B60L 5/40*    (2006.01)
*B60M 1/12*    (2006.01)

(52) U.S. Cl.
CPC .................................. *B60L 5/08* (2013.01); *B60L 5/40* (2013.01); *B60M 1/12* (2013.01); *B60L 2200/30* (2013.01)

(58) Field of Classification Search
CPC .......... B60L 2200/30; B60L 5/08; B60L 5/40; B60L 5/38; B60L 5/36; B60M 1/12; B60M 7/00; B60M 1/30; E01B 25/24
See application file for complete search history.

(56) References Cited

U.S. PATENT DOCUMENTS 1,788,572 A    1/1931    Goodman
1,826,854 A    10/1931    Wilmot
(Continued)

FOREIGN PATENT DOCUMENTS

DE    3018428    11/1981
DE    3610455    10/1987
(Continued)

OTHER PUBLICATIONS

International Preliminary Report on Patentability dated Aug. 15, 2017 for PCT/EP2015/074568, filed Oct. 23, 2015.
(Continued)

*Primary Examiner* — Mark T Le
(74) *Attorney, Agent, or Firm* — Paul D. Bianco; Gary S. Winer; Fleit Intellectual Property Law (57) ABSTRACT

A current collector for an electrical load that can be moved along a conductor line in a travel direction. The current collector has at least one contact piece, which is supported on a rocking arm to be rotatable about an axis of rotation extending perpendicularly to the travel direction. To bring the contact piece into contact with an electrically conductive conductor strand of the conductor line, the contact piece can be moved toward the conductor strand by the rocking arm. The current collector also includes a connection cable,
(Continued)

which connects the contact piece to a connection terminal for the electrical loads in an electrically conductive manner. A conductor line system includes a conductor line and at least one electrical load that can be moved on the conductor line in the longitudinal direction of the conductor line. The conductor line has at least one electrically conductive conductor strand for bringing into sliding contact with at least one contact piece of a current collector.

20 Claims, 7 Drawing Sheets

(56) References Cited

U.S. PATENT DOCUMENTS

| | | | |
|---|---|---|---|
| 1,891,205 | A | 12/1932 | McKenzie |
| 3,730,311 | A | 5/1973 | Maison |
| 4,428,466 | A | 1/1984 | Mayer |
| 4,510,352 | A * | 4/1985 | May .......................... B60L 5/12 191/64 |
| 4,742,185 | A * | 5/1988 | Pelletier ................. B60L 5/085 191/50 |
| 5,037,045 | A * | 8/1991 | Wakabayashi .......... B61C 13/04 104/299 |
| 5,203,437 | A | 4/1993 | Bormann |
| 5,735,374 | A | 4/1998 | Breitbach |
| 7,467,767 | B2 * | 12/2008 | Miles ..................... F16L 3/1008 174/42 |
| 2007/0259574 | A1 * | 11/2007 | Kirstein ............... H01R 4/4818 439/839 |
| 2009/0077293 | A1 * | 3/2009 | Kerrigan .............. H05K 7/1409 710/301 |
| 2011/0237124 | A1 * | 9/2011 | Flaherty ............. H01R 13/6277 439/578 |

FOREIGN PATENT DOCUMENTS

| | | |
|---|---|---|
| DE | 19540914 | 5/1997 |
| EP | 0226497 | 6/1987 |
| EP | 0453721 | 10/1991 |
| EP | 1352777 | 10/2003 |
| FR | 2320204 | 3/1977 |
| JP | S63202202 | 8/1988 |

OTHER PUBLICATIONS

Written Opinion dated Aug. 18, 2016 for PCT/EP2015/074568, filed Oct. 23, 2015.

International Search Report dated Jan. 11, 2016 for PCT/EP2015/074568, filed Oct. 23, 2015.

Result of examination report for German Application No. 10 2015 101 848.9 filed Feb. 10, 2015.

Written Opinion and International Search Report for PCT/EP2015/074568, filed Oct. 23, 2015.

* cited by examiner

CURRENT COLLECTING DEVICE AND CONDUCTOR LINE SYSTEM

FIELD OF THE INVENTION

The invention relates to a current collecting device for a conductor line, as well as to a conductor line system.

BACKGROUND

In known conductor line systems, a movable electrical load travels along a conductor line. The supply of the load with electrical energy here occurs via a current collecting device whose sliding contacts engage conductor strands of the conductor line. The load can be, for example, a transport box of an overhead track conveyor, a cable trolley that can travel on rails, or also so-called E-RTG container cranes that are equipped with an electrical drive that is supplied with electrical energy by the conductor line.

U.S. Pat. No. 1,826,854 A discloses a current collecting device for electrical loads that can move along a contact wire, which can tap current from the contact wire by means of two running rollers arranged consecutively. Here, the current collecting rollers are connected to sliding contacts of a conductor ring arrangement via short supply lines. The contact surfaces of the sliding contact ring arrangement, which are stationary relative to the sliding contacts, are arranged on an arm, which itself is arranged above a base. Supply lines extend from the stationary contact surfaces of the sliding contact ring arrangement to a second sliding contact ring arrangement arranged on the base. This construction is expensive due to the two sliding contact ring arrangements, and at least in the area of the first sliding contact ring arrangement, which is not shielded relative to the exterior, it is contact-endangered.

EP 0 226 497 B1 discloses a current collecting head for a trolley bus, in which the lines are led between a sliding contact that can be rotated through a large angle and a connection clamp, in part in a rotating arm of the current collecting device and in part exposed in open areas. In the open areas, the lines risk being damaged from the outside, or being caught. Moreover, the lines are not led in a defined manner or fastened between a sliding contact and a connection clamp, so that they impede the movements of the arm and of the sliding contact due to their current position. In addition, the lines are continually moved back and forth as a result, so that the electrically conductive line cores can be damaged and the insulations can be abraded. Thus, there is also a risk of injury to persons if the line cores are exposed in places.

In addition, the movement of the sliding contact is limited there only by two end abutments. At best, an automatic resetting into a preferred resting position with good contact on the conductor strand of the conductor line is provided by the lines that are led haphazardly through the current collecting head.

DE 30 18 428 A1 discloses a control current transferring device with a contact sensor arrangement for trolleys in conveyor systems, which is in springy contact with the control current rail. There too, the control current lines are only partially protected and largely led freely movably through an elongate housing. Here too, there is the risk that the control current lines or their insulation could be damaged due to continual movements of the control current transferring device and the contact sensor arrangement.

In JP S63-202202 A, in the case of a current collecting device for conductor lines, the connection line to the sliding contact pieces is also largely free and attached only at one site of the current collecting device to a clip made of a metal plate. Here, it is precisely in the area of the clip that there is a risk of the sharp metal plate damaging the insulation of the line. Otherwise, the risk also exists of the line being caught or migrating.

In EP 1 352 777 A1 as well, in a current collecting device for conductor lines, the exposed line extends away from the sliding contact, so that here, too there is an increased risk of damage.

DE 36 10 455 A1 discloses a current collecting head with two sliding contact pieces arranged on a rocker mounted in manner so it can rotate. A tilting area of the rocker is limited by abutments on the bearing of the rocker. However, between the abutments, the rocker can be moved freely back and forth, so that no optimal contact on the conductor strand of the conductor line is ensured. There, the connecting line also extends largely exposed and unprotected away from the sliding contact pieces.

SUMMARY OF THE INVENTION

Therefore, the problem of the invention is to provide a current collecting device and a conductor line system, which overcomes the above-mentioned disadvantages and enables a reliable guiding of the current collecting device contact in the conductor strand of the conductor line, as well as a reliable energy transmission.

The invention solves the problem by a current collecting device and a conductor line system as disclosed herein. Advantageous developments and embodiments of the invention are also disclosed.

The current collecting device mentioned at the beginning is characterized according to the invention in that the connection cable is led continuously in a cable guide channel extending at least through the rocker arm.

In an advantageous design, the sliding contact piece can be arranged in a sliding contact piece holder, which is movably arranged on a hollow bearing block—preferably of hollow-cylindrical design—of the rocker arm. Here, the connection cable arriving from the sliding contact piece can be led through the bearing block of hollow design into the cable channel.

Preferably, the bearing block can comprise a hollow, preferably a hollow-cylindrical, connection piece that is inserted into a corresponding, preferably hollow, cylindrical opening of the rocker arm. In order to hold the bearing block on the rocker arm, the connection piece can be engaged in the opening by means a click-on and/or snap connection. Here, preferably, the connection piece can be movable relative to the opening in a direction extending towards the conductor strand between two end positions. In an advantageous design, the sliding contact piece can be pushed via a spring acting between a rocker arm and a bearing block, in particular coil springs, in the direction towards the conductor strand.

Moreover, the rocker arm can be arranged on a base in manner so it can rotate about a rotation axis extending perpendicularly to the direction of travel, wherein the rocker arm is pushed by an additional spring, in particular a coil spring, away from the base and towards the conductor strand.

In an embodiment that is advantageous from the viewpoint of installation, the base can be clipped, by means of one or more snap connections, to a support plate. As a result, a rapid and simple exchange of the current collecting device can occur, for example, in the case in of a defect of the current collecting device, or of worn sliding contact pieces. Advantageously, a connection clamp for the end of a connection line for the sliding contact pieces, which is at a distance from the sliding contact piece, can also be detachably connected to the base, preferably by means of plug connection with a dovetail-like design between a connection clamp and a base.

Advantageously, the connection cable arriving from the rocker arm can be led through a cable input of the base, and in the base it can be led, still protected in the cable channel, to the connection clamp.

In order to enable a defined and reliable guiding of the connection cable, holding means are provided on the rocker arm for holding the connection cable. Said holding means fasten the connection cable so that it does not exert disadvantageous effects that cannot be defined beforehand on the movement of the rocker arm. For this purpose, the holding means advantageously can comprise mutually facing clamping arms, between which the connection cable is held with clamping action.

Advantageously, the connection cable can be led from a first side of the rocker arm through a first aperture of the rocker arm onto a facing side of the rocker arm, and from there via a second aperture through the rocker arm back to the first side of the rocker arm. Here, advantageous holding means can be arranged in the area between the first aperture and the second aperture through the rocker arm, so that a satisfactory and reliable guiding of the connection cable can be achieved.

Advantageously, the sliding contact piece can be arranged on a rocker that is arranged on the rocker arm in such a manner that it can rotate about a rotation axis extending perpendicularly to the direction of travel. Here, the rocker can have an aperture through which the connection cable coming from the sliding contact piece is introduced into the area of the cable guide channel, which extends through the rocker arm. Preferably, the rocker can [sic].

Preferably, the connection cable can be detachably connected, by means of a plug arranged at one end, into a socket connected in an electrically conductive manner to the sliding contact piece.

Preferably, the rocker arm can be arranged in such a manner that it can rotate on a base about an additional rotation axis extending perpendicularly to the direction of travel and parallel to the rotation axis of the rocker, wherein, advantageously, the rocker arm can be pushed by a spring away from the base and towards the conductor strand. In this manner, the rocker and the sliding contact pieces can be reliably pushed onto the conductor strand. In addition, the rocker arm can also be positioned about an additional rotation axis perpendicular to the direction of travel and perpendicular to the rotation axis of the rocker, that is to say perpendicular on a plane defined by the guide strands. As a result, the rocker can compensate for sideways deviations from the direction of travel.

In an embodiment that is advantageous from the viewpoint of installation, the base can be clipped to a support plate by means of one or more snap connections. As a result, a rapid and simple exchange of the current collecting device can occur, for example, in the case of a defect of the current collecting device, or of worn sliding contact pieces. Advantageously, a connection clamp for the end of a connection line, which is at a distance from the sliding contact piece, for the sliding contact pieces can be detachably connected to the base, preferably by means of a plug connection of dovetail-like design between a connection clamp and a base.

Advantageously, the base, as well as the rocker arm, the bearing block, the hollow cylindrical connection piece and/or the rocker can also be made of plastic, in particular a hard plastic such as duroplastics, for example.

By means of a conductor line system provided with such a current collecting device, these advantages can be used satisfactorily. In the process, advantageously, the movable electrical loads can comprise multiple current collecting devices arranged next to one another for contacting correspondingly adjacently-arranged conductor strands of the conductor line.

BRIEF DESCRIPTION OF THE DRAWINGS

The invention is described below using detailed embodiment examples in reference to the accompanying drawings. In the drawings.

DETAILED DESCRIPTION OF THE INVENTION

Figure 1:
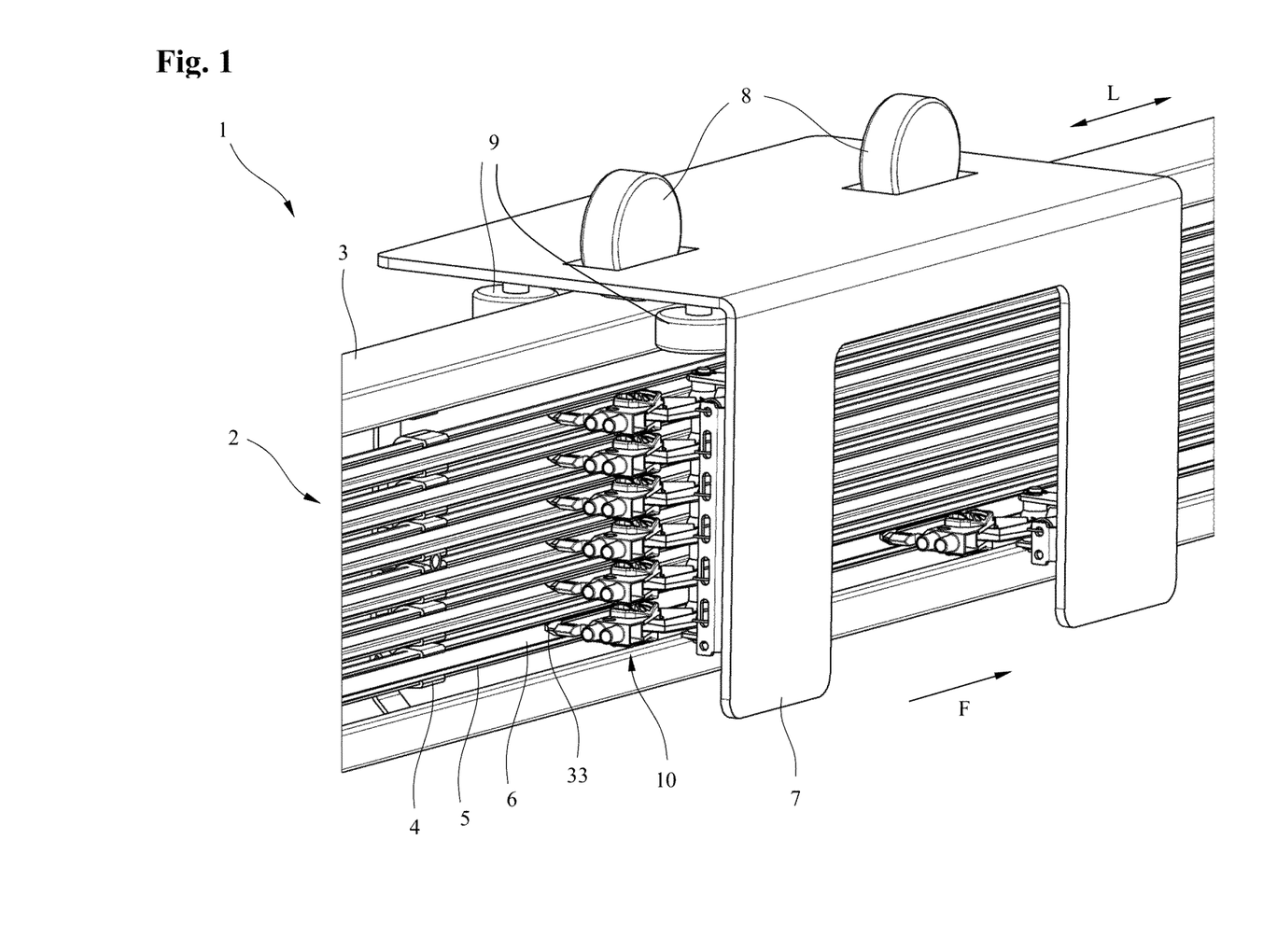
FIG. 1 shows a diagrammatic, three-dimensional view of a section of a conductor line system according to the invention.

The conductor line system 1, partially represented in FIG. 1, comprises an elongate conductor line 2 and a rail strand 3 having a double-T shape in cross section. On the rail strand 3, a conductor strand holder 4 is arranged. Additional conductor strand holders arranged along the rail strand 3 are not represented in the drawing.

In total, the conductor strand holder 4 comprises six elongate profiled insulation sections extending along the conductor line 2 in a longitudinal direction L and described below using insulation profile 5. The indications on this also correspondingly apply to the additional profiled insulation sections.

An electrically conductive conductor strand 6, which is substantially C- or U-shaped in cross section, is inserted into the substantially U-shaped electrically non-conductive profiled insulation section 5. The open side of the U-shaped cross section of insulation profiled section 5 and conductor strand 6 face the observer in FIG. 1. Usually, one of the conductor strands inserted in the profiled insulation sections is a ground and/or protection conductor. The other conductor strands are current- or voltage-conducting phase conductor strands and used for supplying electrical energy to movable electrical loads indicated by a transport box 7.

The movable transport box 7, which points in a direction of travel F extending in longitudinal direction L, has an electrical drive motor, not represented in FIG. 1, for drive wheels 8. The drive wheels 8 run on the horizontal upper T-shaped area of the rail strand 3. On the side, the transport box 7 is led through side guide wheels 9.

In order to supply the electrical load to the drive motor of the transport box 7, for example, and also in order to connect the electrical loads to the ground and/or protection conductor strand, at least one current connecting device is provided for each conductor strand, which is explained by way of an example using a current collecting device 10 represented in detail in FIGS. 2 to 9. Corresponding indications also apply to the other current collecting devices.

Figure 2:
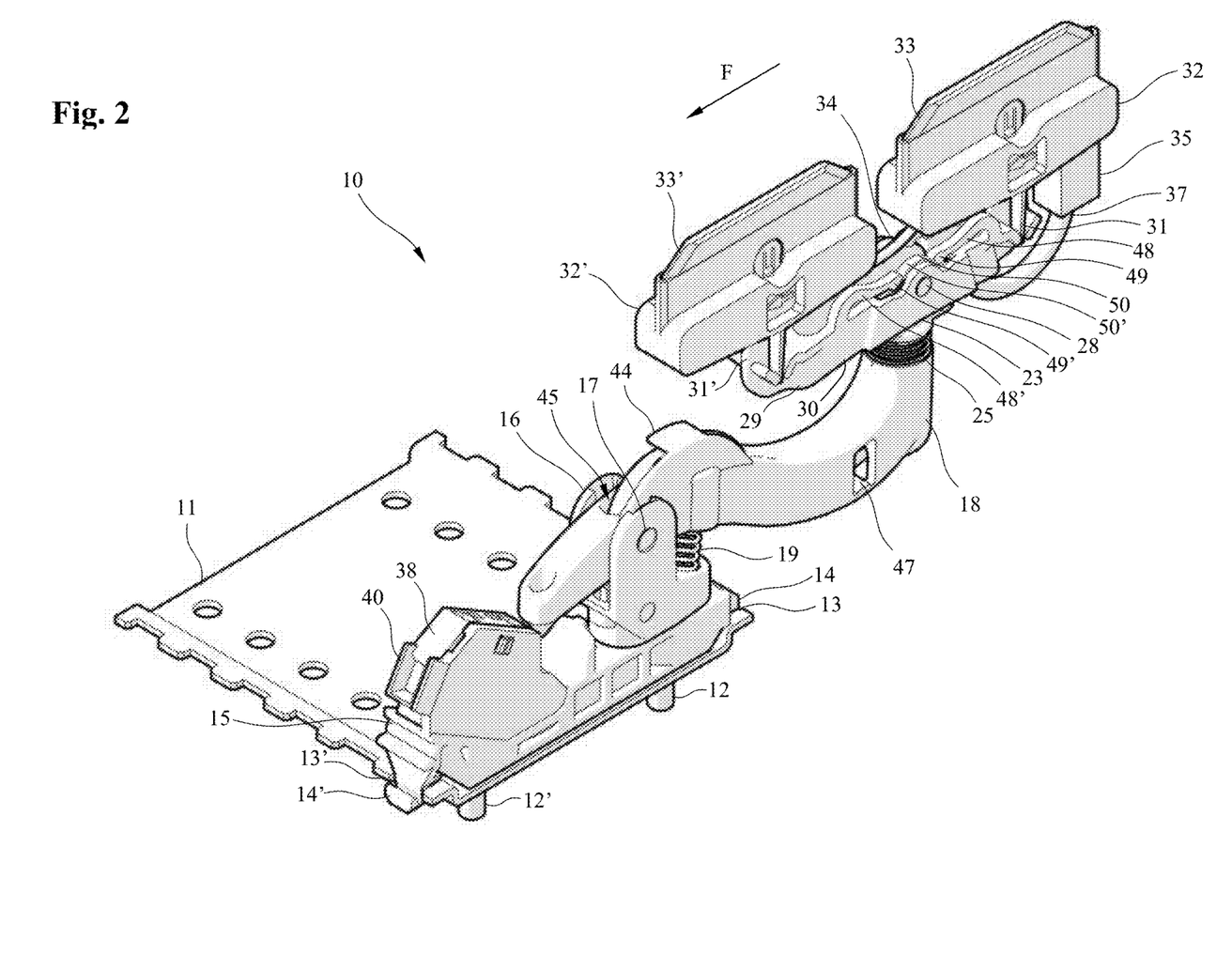
FIG. 2 shows a diagrammatic, three-dimensional view of a current collecting device of the conductor line system of FIG. 1.
Figure 3:
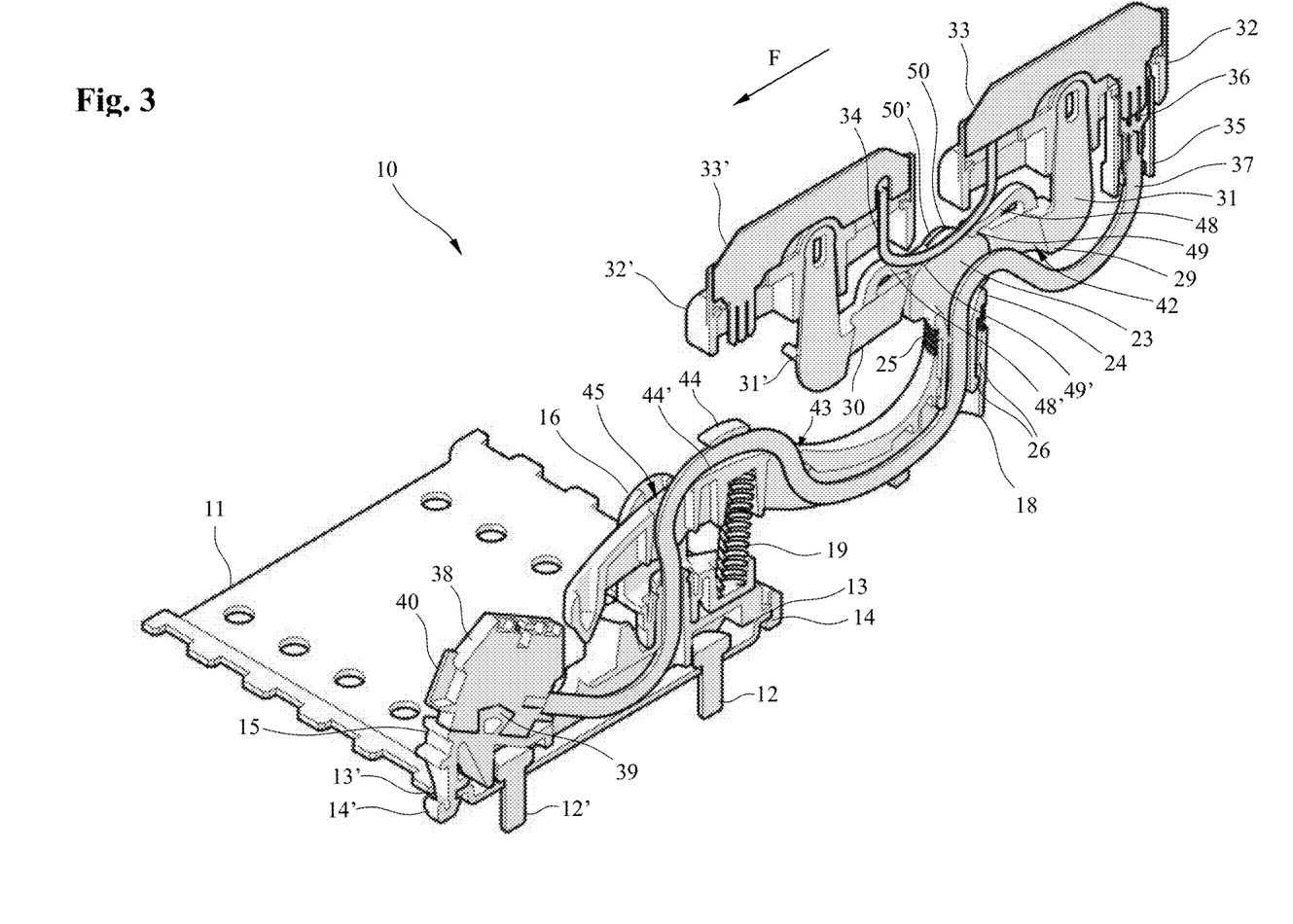
FIG. 3 shows a cross-sectional view through current the collecting device of FIG. 2.
Figure 4:
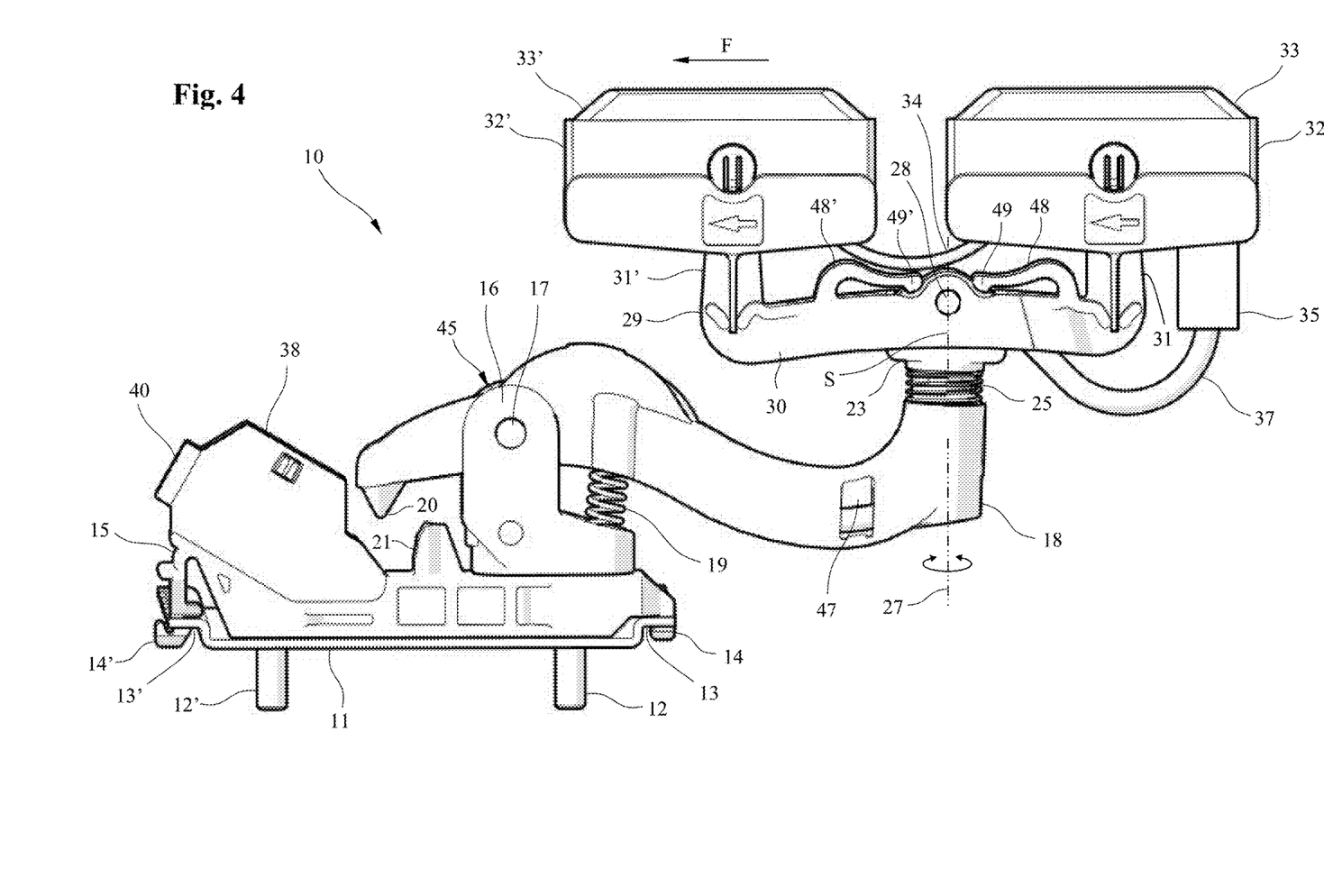
FIG. 4 shows a lateral top view on the current collecting device according to FIG. 2.

In order to attach the current collecting device 10 to the transport box 7, a support plate 11 is provided. This support plate is firmly fastened by means of connection screws 12, 12' to the inner side of the arm of the transport box 7, which projects downwardly. On opposite facing side edges of the support plate 11, multiple setbacks 13, 13' are arranged so that they are aligned with one another in pairs. Snap connections 14, 14' of a base 15 of the current collecting device are clipped into these setbacks 13, 13'. As can be seen in FIGS. 2 and 3, six pairs of setbacks 13, 13' are provided in the present case, in order to be able to attach six current collecting devices of FIG. 1.

On the base 15, a fork-shaped bearing 16 is provided, which is rotatable about a rotation axis that extends perpendicularly on the support plate 11, and on which a rocker arm 18 is arranged in manner so it can rotate about a first rotation axis 17. The rocker arm 18 is pushed away from the base 15 via a coil spring 19 shown in a pretensioned state in FIGS. 2 to 5, and, thus, pushes in the direction of the conductor strand 6. Here, the coil spring 19 is arranged on an elongated base of the bearing 16 and, thus, is capable of rotating with the bearing 16 about the rotation axis extending perpendicularly on the support plate 11. Instead of a coil spring, other suitable elements can also be used, which push the rocker arm 18 away from the base 15 and towards the conductor strand 6.

In order to prevent the rocker arm 18 from moving too far in the direction of the conductor strand 6, a centering pin 20 is provided on the shorter end, the left end in FIGS. 2 to 5, which centering pin abuts against a centering abutment 21 arranged on the base 15. This centering abutment becomes active particularly if the transport box 11 with the current collecting device 10 is taken off the conductor line 2 and then inserted again. Preferably, for this purpose, the centering pin 20 can be formed in the shape of a wedge or cone and engage in the abutment 21 formed in a correspondingly inner wedge- or cone-shape. As a result, the rocker arm 18 can be moved advantageously into a position extending parallel to the direction of travel F and to the longitudinal direction L of the conductor line 2, in order to be able to introduce the current collecting device 10 cleanly into the conductor strand 6.

On the longer end, in FIGS. 2 to 5 the right end, a hollow cylindrical connection piece 24 of bearing block 23 is inserted into opening 22 [not shown in drawings] of the rocker arm 18. The bearing block 23 is pushed via an additional coil spring 25 towards the conductor strands 6 and prevented from falling out of the opening 22 by means of a click-on connection 26. As a result, the bearing block 23 can yield slightly in direction of the conductor strand 6, as a result of which irregularities in the conductor strand 6 can be compensated.

On the bearing block 23, a rocker 29, which is essentially U-shaped when viewed from the side, with a connection arm 30 arranged in such a manner that it can rotate about a second rotation axis 27, to the end of which connection arm support arms 31, 31', each with a sliding contact piece holder 32, 32,' are arranged. The piece holders 32, 32' each support a sliding contact piece 33, 33', which are provided for the frictional contacting of the conductor strand 6. The rocker 29 has longitudinal recesses or depressions, at least in the area between the support arms 31, 31' and the bearing block 23.

The base 15 and also the rocker arm 18, the bearing block 23 with the hollow cylindrical connection piece 24, and the rocker 29 are here produced from plastic, in particular from a hard plastic such as duroplastics, for example.

In order to convey the electrical current from the conductor strand 6 to the electrical loads on the transport hook 7, the two sliding contact pieces 33, 33' are connected to one another in an electrically conductive manner via a connection cable 34. Moreover, a socket 35 for a plug 36 is provided on the sliding contact piece holder 31, on the right in FIGS. 2 to 5. The plug 36 is attached at one end of a connection cable 37. The connection cable 37 is firmly connected at the other insulated end to a connection clamp 38. The connection clamp 38 is here connected to the base 15 via a connection 39 of dovetail-like design. Via an additional connection 40 of the connection clamp 38, a connection line to one or multiple electrical loads of the transport box 7 can then be established.

The connection cable 37 is here led in a defined manner on a path from the socket 35 to the connection clamp 38, advantageously in a cable guide channel 41. By means of this defined guiding of the cable 37, disadvantageous influences on the movability of the rocker arm 18 or rocker 29 that would otherwise occur can be largely prevented.

First, the cable channel 41 has an aperture 42 in the bottom side of the rocker 29, through which the cable 37 arriving from the socket 35 is introduced between the two side walls of the rocker 29, and then led through the hollow cylindrical connection piece 24 of the bearing block 23. From there, the cable 37 is then led through the front area of the rocker arm 18, which is preferably open on the bottom side. As a result, the cable 37 can be easily installed, so that the free end can be led through an aperture 43 arranged adjacently to the bearing 16 in the upper wall of the rocker arm 18 and then in a clamping manner between two clamping arms 44, 44'. Subsequently, the cable 37 is introduced downwardly through an additional aperture 45 in the shorter arm of the rocker arm 18 and through a hollow cylindrical cable inlet 46 into the base 15, where it is then led, still in the cable channel 41, to the connection clamp 38.

A viewing window 47 in the longer portion of the rocker arm 18 also makes it possible to conduct a check from the side to determine whether the cable 37 is properly guided.

In order to ensure that the sliding contact pieces 33, 33' are both applied as well as possible and evenly against the conductor strand 6, it can be advantageously ensured that, in the case of deflection from its resting position shown in the drawings, the rocker 29 automatically moves back into this resting position. For this purpose, two symmetrically formed spring arms 48, 48', which point in the direction of the bearing block 23, are provided on the horizontal connection arm of the rocker 29. At their free ends, the spring arms 48, 48' have thickened sliding contacts 49, 49', which can slide on sliding surfaces 50, 50' of the bearing block 23, which are also formed symmetrically.

Since the symmetrical spring arms 48, 48' are pretensioned against the sliding surfaces 50, 50', a resetting force is continually exerted as a result, which moves the rocker 29 into the resting position shown in the figures. In the drawings, this is represented in that the sliding contacts 49, 49' presumably penetrate into the sliding surfaces 50, 50'. However, the sliding contacts 49, 49' in fact slide on the sliding surfaces 50, 50' without penetrating into them.

If the rocker 29 is deflected from the resting position, then the resetting force of the spring arm 48, 48' that is moved with the rocker 29 away from the base 15 and towards the conductor strand 6 is increased. The resetting force of the respective other spring arm 48, 48', on the other hand, decreases, so that the rocker 29 is again moved back into the resting position. If the rocker 29 is raised on the right in FIGS. 2 to 5, then the resetting force of the right spring arm 48 increases, while the left spring arm 48' is untensioned. As a result, the rocker 29 is then moved back into the resting position shown in FIGS. 2 to 5.

For this purpose, the sliding surfaces 50, 50' are formed so that, when the rocker 29 is moved out of the resting position, the spring arm 48, 48' that is moved out of its resting position away from the base 15 and towards the conductor strand 6 is more strongly tensioned, while the other spring arm 48, 48' that is moved out of its resting position towards the base 15 and away from the conductor strand 6 is untensioned.

In an advantageous embodiment, for this purpose, the area of the sliding surfaces 50, 50' that extend from the resting position of the sliding contacts 49, 49' to the symmetry axis S through the third rotation axis 28 extend more steeply than an imaginary circle G of radius R of the sliding contacts 49, 49' about the rotation axis 28. In the same way, the other area of the sliding surfaces 50, 50' can extend at a less steep slope. This resetting mechanism is represented, for example, on the left in FIG. 5a.

Figures 5, 5A:
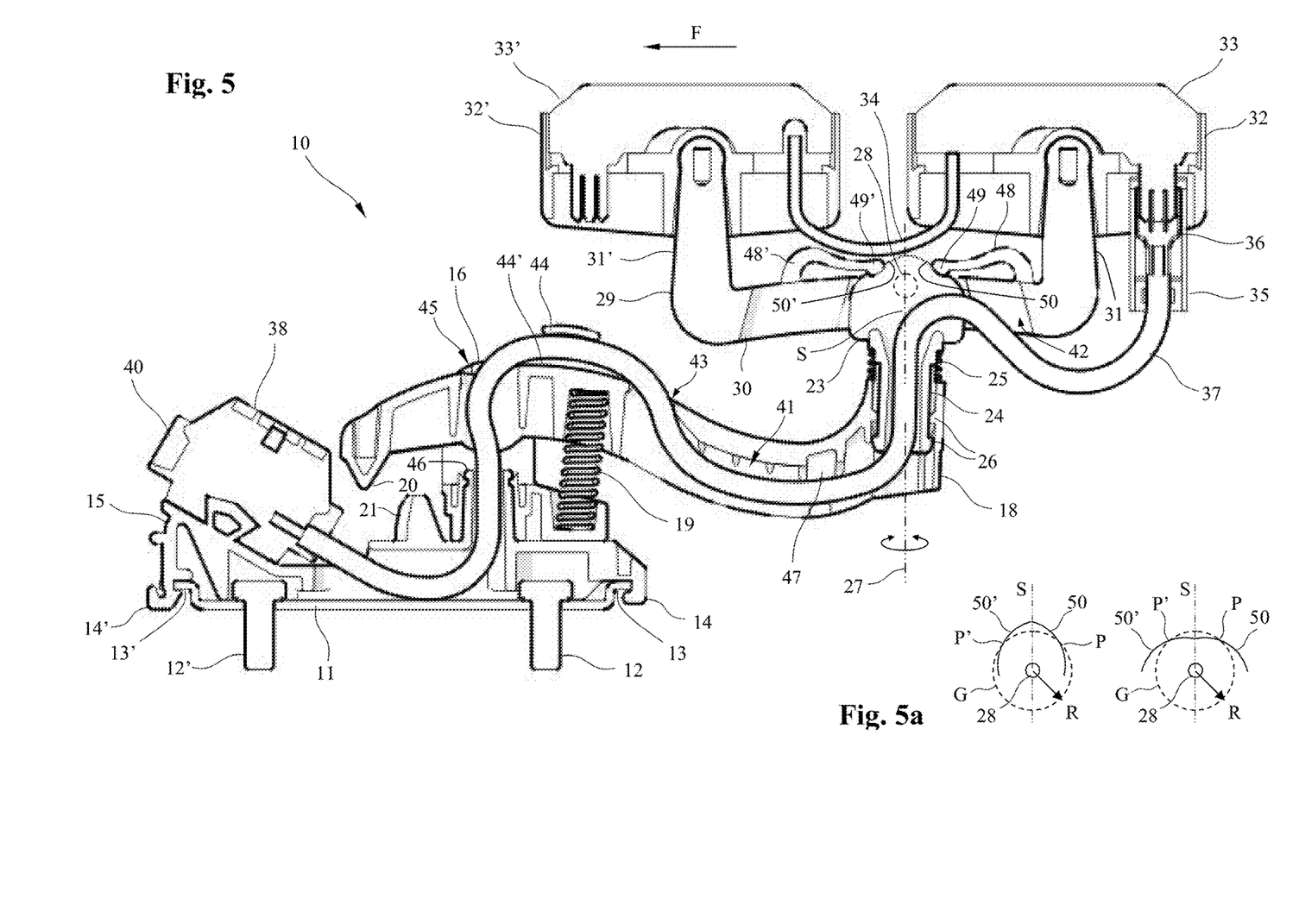
FIG. 5 shows a lateral cross-sectional view on the current collecting device according to FIG. 3.
FIG. 5a shows detail views of the resetting mechanism of FIG. 5.
Figures 6, 7:
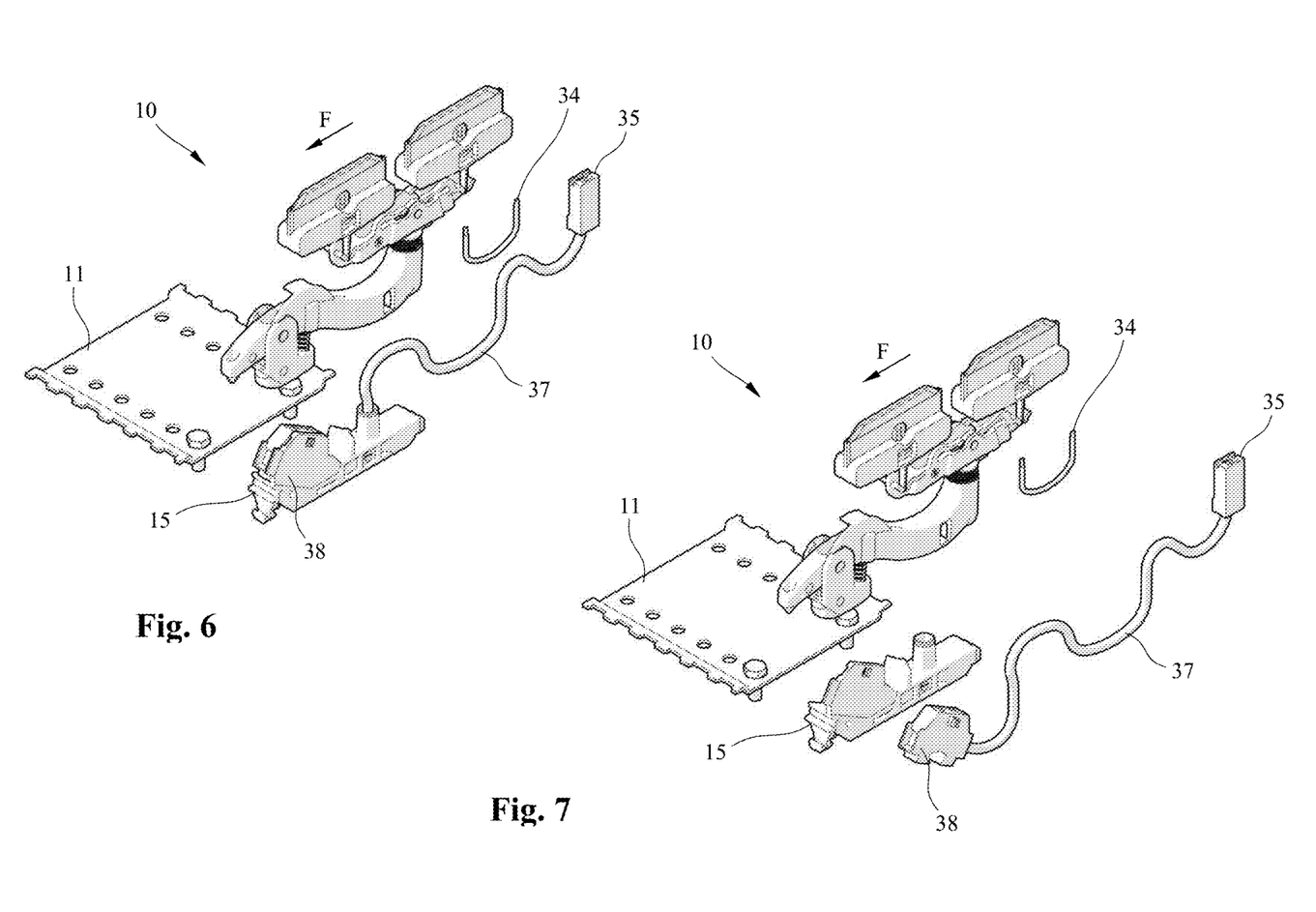
FIGS. 6-9 show exploded representations of the current collecting device of FIG. 3.
Figures 8, 9:
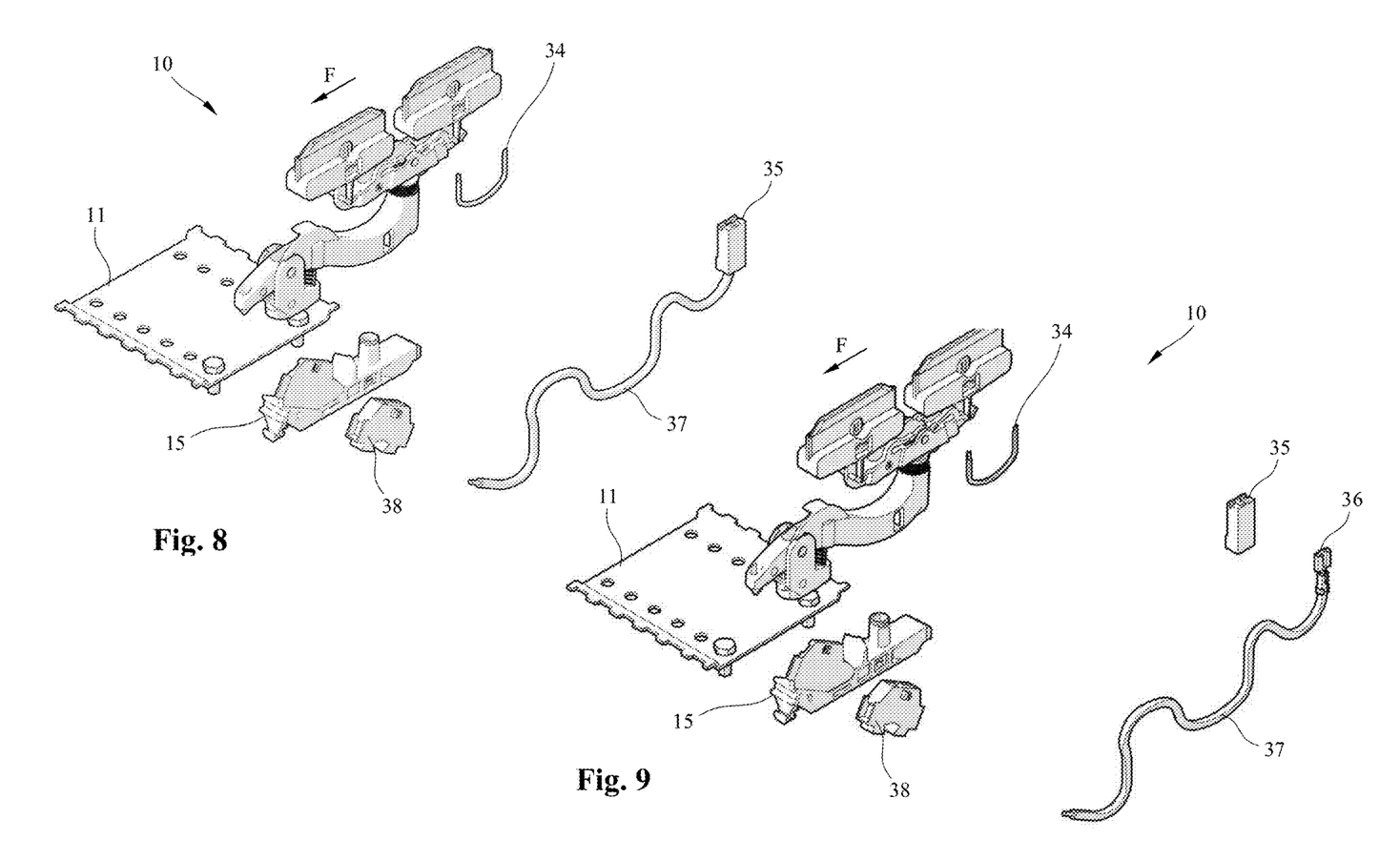

For example, the sliding surfaces 50, 50' can be formed, as shown in the detail of FIG. 5a, as a segment of circle of radius R that intersects the imaginary circle G of the sliding contacts 49, 49' in the resting position of the sliding contacts 49, 49' on the sliding surfaces 50, 50' at the intersection point P or P'. However, other designs of the sliding surfaces can also be provided that have the same effect; for example, a straight sliding surface that extends through the intersection point P tangentially on the imaginary circle G.

The area of the sliding surfaces 50, 50' that extend from the resting position of the sliding contacts 49, 49' away from the symmetry axis S, can also have a flatter course than the imaginary circle G of the sliding contacts 49, 49'. As a result, when the rocker 29 is deflected from the resting position, the spring arm 48, 48' that moves away from the conductor strand 6 and towards the base 15 can be more strongly tensioned than in the resting position, so that it pulls the rocker 29 back into the resting position. This resetting mechanism is represented, for example, on the right in FIG. 5a.

If the two variants represented in FIG. 5a are linked to one another, namely in such a manner that, on the left in FIG. 5a, the sliding surfaces located above the intersection points P, P' are used, and, on the right in FIG. 5a, the sliding surfaces located beneath the intersection points P, P', are used, preferably also only one spring arm 48, 48' can be used. Since, if the spring arm 48, 48' is moved out of the intersection point P, P', which in fact corresponds to the compensated resting position of the rocker 29, then the spring arm 48, 48' is always more strongly tensioned than when it is at the intersection point P, P', so that, in this way, it exerts a force on the rocker 29 such that it is moved back into the resting position. In principle, it would then also be possible to use only one spring arm 48 or 48' on one side of the symmetry axis S, and the other spring arm 48' would then no longer be needed. However, for reasons pertaining to reliability and selection safety, it is advantageous to use two facing spring arms 48, 48'.

Preferably, the spring arms 48, 48' can be produced from the same material as the rocker 29, and, in particular, so that they form a single piece with the rocker 29.

In principle, the spring arms 48, 48' can also be provided on the main block 23, so that corresponding sliding surfaces are provided on the rocker 29, which, in the case of a deflection of the rocker 29 from the resting position deflection, more strongly tensions the spring arm that acts against the deflection.

The additional FIGS. 6 to 9 again show exploded representations of the current collecting device 10 represented in detail in FIGS. 2 to 5.

In order to be able to introduce the sliding contact pieces 33, 33' into the U-shaped conductor strand 6 and move it along said conductor strand in the travel direction F, the rocker 29 and the rocker arm 18 can here move substantially in a travel plane extending through the conductor strand 6, except for lateral movements that per se are undesirable and that are caused by an inaccurate course of the conductor strand, of the conductor line, and of the travel movement of the load. The travel plane here extends substantially perpendicularly to the plane through the multiple conductor strands.

LIST OF REFERENCE NUMERALS

1 Conductor line system
2 Conductor line
3 Rail strand
4 Conductor strand holder
5 Profiled insulation section
6 Conductor strand
7 Transport box
8 Drive wheels
9 Side guide wheels
10 Current collecting device
11 Support plate
12, 12' Connection screws
13, 13' Setbacks
14, 14' Snap connections
15 Base
16 Fork-shaped bearing
17 First rotation axis of the rocker arm relative to the base
18 Rocker arm
19 Coil spring
20 Centering pin
21 Centering abutment
22 Hollow cylindrical opening
23 Bearing block
24 Hollow cylindrical connection piece
25 Coil spring
26 Snap connection
27 Second rotation axis of the bearing block relative to the rocker arm
28 Third rotation axis of the rocker relative to the bearing block
29 Rocker
30 Connection arm
31, 31' Support arm
32, 32' Sliding contact piece holder
33, 33' Sliding contact piece
34 Connection cable
35 Socket
36 Plug
37 Connection cable
38 Connection clamp
39 Plug connection (dovetail)

40 Connection electrical loads
41 Cable guide channel
42 Aperture rocker
43 Aperture rocker arm
44, 44' Clamping arm
45 Additional aperture rocker arm
46 Cable inlet base
47 Viewing window
48, 48' Spring arms
49, 49' Sliding contacts
50, 50' Sliding surfaces
L Longitudinal direction conductor line
F Direction of travel current collecting device
G Imaginary circle of the sliding contacts about the third rotation axis
P, P' Intersection point sliding surfaces with imaginary circle of the sliding contacts
R Radius segment of a circle of the sliding surfaces
S Symmetry axis of the sliding surfaces

The invention claimed is:

1. A current collecting device for an electrical load that can travel in a direction of travel along a conductor line, with a sliding contact piece mounted on a rocker arm in such a manner that the sliding contact piece can rotate about a rotation axis extending perpendicularly to the direction of travel, through which rocker arm the sliding contact piece can be moved back and forth for contact with an electrically conductive conductor strand of the conductor line; and with a connection cable connecting the sliding contact piece in an electrically conductive manner to a connection clamp for the electrical load, wherein the connection cable is led continuously in a cable guide channel extending at least through the rocker arm, wherein the sliding contact piece is arranged on a sliding contact piece holder, which is movably arranged on a bearing block of the rocker arm, the bearing block having a hollow design; wherein the bearing block comprises a hollow connection piece which is inserted into a corresponding opening of the rocker arm; and wherein the connection piece is movable relative to the opening in a direction extending towards the conductor strand between two end positions.

2. The current collecting device according to claim 1, wherein the connection cable arriving from the sliding contact piece is led through the bearing block into the cable guide channel.

3. The current collecting device according to claim 1, wherein the connection piece engages the opening via a clip-on connection.

4. The current collecting device according to claim 1, wherein the sliding contact piece is pushed in the direction of the conductor strand via a spring acting between the rocker arm and the bearing block.

5. The current collecting device according to claim 1, wherein the rocker arm is arranged on a base in such a manner that it can rotate about a rotation axis extending perpendicularly to the direction of travel, wherein the rocker arm is pushed away from the base and towards the conductor strand by a spring.

6. The current collecting device according to claim 5, wherein the base can be clipped to a support plate by snap connections.

7. The current collecting device according to claim 5, wherein the connection clamp is attached on the base.

8. The current collecting device according to claim 5, wherein the connection cable arriving from the rocker arm is introduced through a cable inlet of the base.

9. The current collecting device according to claim 1, wherein holding means for holding the connection cable are provided on the rocker arm.

10. The current collecting device according to claim 9, wherein the holding means comprise mutually facing clamping arms between which the connection cable is held in a clamping manner.

11. The current collecting device according to claim 1, wherein the connection cable is led from a first side of the rocker arm through a first aperture of the rocker arm to the facing side of the rocker arm and from there via a second aperture through the rocker arm back again to the first side of the rocker arm.

12. The current collecting device according to claim 11, wherein holding means for holding the connection cable are provided on the rocker arm and are arranged in an area between the first aperture and the second aperture through the rocker arm.

13. The current collecting device according to claim 1, wherein the sliding contact piece is arranged on a rocker, which is arranged on the rocker arm in such a manner that it can rotate about a rotational axis extending perpendicularly to the direction of travel.

14. The current collecting device according to claim 13, wherein the rocker has an aperture, through which the connection cable arriving from the sliding contact piece is introduced into an area of the cable guide channel, which extends through the rocker arm.

15. The current collecting device according to claim 1, wherein the connection cable is detachably connected by a plug arranged on one end into a socket connected in an electrically conductive manner to the sliding contact piece.

16. A conductor line system comprising:
a conductor line;
at least one electrical load that can be moved on the conductor line in a longitudinal direction; and
the current collecting device of claim 1,
wherein the conductor line comprises at least one electrically conductive conductor strand for sliding contact with the sliding contact piece of the current collecting device.

17. The conductor line system according to claim 16, wherein the at least one electrical load comprises a plurality of adjacently arranged current collecting devices for contacting correspondingly adjacently arranged conductor strands of the conductor line.

18. A current collecting device for an electrical load that can travel in a direction of travel along a conductor line, with a sliding contact piece mounted on a rocker arm in such a manner that the sliding contact piece can rotate about a rotation axis extending perpendicularly to the direction of travel, through which rocker arm the sliding contact piece can be moved back and forth for contact with an electrically conductive conductor strand of the conductor line; and with a connection cable connecting the sliding contact piece in an electrically conductive manner to a connection clamp for the electrical load, wherein the connection cable is led continuously in a cable guide channel extending at least through the rocker arm, wherein the sliding contact piece is arranged on a sliding contact piece holder, which is movably arranged on a bearing block of the rocker arm, the bearing block having a hollow design; and wherein the sliding contact piece is pushed in the direction of the conductor strand via a spring acting between the rocker arm and the bearing block.

19. A current collecting device for an electrical load that can travel in a direction of travel along a conductor line, with a sliding contact piece mounted on a rocker arm in such a manner that the sliding contact piece can rotate about a rotation axis extending perpendicularly to the direction of travel, through which rocker arm the sliding contact piece can be moved back and forth for contact with an electrically conductive conductor strand of the conductor line; and with a connection cable connecting the sliding contact piece in an electrically conductive manner to a connection clamp for the electrical load, wherein the connection cable is led continuously in a cable guide channel extending at least through the rocker arm, and wherein the connection cable is led from a first side of the rocker arm through a first aperture of the rocker arm to the facing side of the rocker arm and from there via a second aperture through the rocker arm back again to the first side of the rocker arm.

20. The current collecting device according to claim 19, wherein holding means for holding the connection cable are provided on the rocker arm and are arranged in an area between the first aperture and the second aperture through the rocker arm.

\* \* \* \* \*